(12) United States Patent
Lin et al.

(10) Patent No.: US 11,409,994 B2
(45) Date of Patent: Aug. 9, 2022

(54) METHODS FOR IMAGE SEGMENTATION, COMPUTER DEVICES, AND STORAGE MEDIUMS

(71) Applicant: SHENZHEN UNIVERSITY, Guangdong (CN)

(72) Inventors: Di Lin, Guangdong (CN); Hui Huang, Guangdong (CN)

(73) Assignee: SHENZHEN UNIVERSITY, Guangdong (CN)

( * ) Notice: Subject to any disclaimer, the term of this patent is extended or adjusted under 35 U.S.C. 154(b) by 0 days.

(21) Appl. No.: 16/490,696

(22) PCT Filed: May 15, 2018

(86) PCT No.: PCT/CN2018/086832
§ 371 (c)(1),
(2) Date: Sep. 3, 2019

(87) PCT Pub. No.: WO2019/218136
PCT Pub. Date: Nov. 21, 2019

(65) Prior Publication Data
US 2021/0374478 A1    Dec. 2, 2021

(51) Int. Cl.
*G06K 9/62* (2022.01)
*G06N 3/04* (2006.01)
(Continued)

(52) U.S. Cl.
CPC ......... *G06K 9/6261* (2013.01); *G06K 9/6256* (2013.01); *G06N 3/0454* (2013.01); *G06N 3/08* (2013.01); *G06V 10/751* (2022.01)

(58) Field of Classification Search
CPC .. G06K 9/6261; G06K 9/6202; G06K 9/6256; G06N 3/0454; G06N 3/08
(Continued)

(56) References Cited

U.S. PATENT DOCUMENTS

| 9,939,272 | B1 | 4/2018 | Liao et al. |
| 2016/0358024 | A1 | 12/2016 | Krishnakumar et al. |
| 2019/0304098 | A1* | 10/2019 | Chen ............ G06K 9/627 |

FOREIGN PATENT DOCUMENTS

| CN | 106127725 A | 11/2016 |
| CN | 106530320 A | 3/2017 |

(Continued)

OTHER PUBLICATIONS

Lin, "Cascaded Feature Network for Semantic Segmentation of RBG-D Images," 2017 IEEE International Conference on Computer Vision (ICCV), Dec. 31, 2017 (9 pages).
(Continued)

*Primary Examiner* — Michael R Neff
(74) *Attorney, Agent, or Firm* — Brandon V. Zuniga; James R. Gourley; Carstens & Cahoon, LLP

(57) ABSTRACT

Methods for image segmentation, computer devices, and storage mediums. The method includes acquiring a to-be-segmented image, inputting the to-be-segmented image into an input variable of a full convolution neural network and outputting a convolution characteristic pattern; inputting the convolution characteristic pattern into an input variable of a context-switchable neural network and outputting context expression information; and generating an intermediate characteristic pattern for image segmentation according to the convolution characteristic pattern and the context expression information.

17 Claims, 7 Drawing Sheets

(51) Int. Cl.
*G06N 3/08* (2006.01)
*G06V 10/75* (2022.01)

(58) Field of Classification Search
USPC .......................................................... 382/100
See application file for complete search history.

(56) References Cited

FOREIGN PATENT DOCUMENTS

| | | |
|---|---|---|
| CN | 106651877 A | 5/2017 |
| CN | 107169974 A | 9/2017 |
| CN | 107403430 A | 11/2017 |
| CN | 107784654 A | 3/2018 |
| CN | 107808111 A | 3/2018 |
| CN | 108765425 A | 11/2018 |

OTHER PUBLICATIONS

International Search Report for Application No. PCT/CN2018/086832 dated Feb. 27, 2019 (8 pages).
Office Action for Chinese Application No. 201810463609.0 dated Aug. 10, 2021 (6 pages).

\* cited by examiner

METHODS FOR IMAGE SEGMENTATION, COMPUTER DEVICES, AND STORAGE MEDIUMS

CROSS-REFERENCE TO RELATED APPLICATIONS

This application is a US 371 application from PCT/CN2018/086832 filed May 15, 2018, the technical disclosures of which are hereby incorporated herein by reference.

TECHNICAL FIELD

This application relates to the field of image processing technologies, and more particularly to methods for image segmentation, computer devices, and storage mediums.

BACKGROUND

With the development of image processing technology, image segmentation is an important part of image processing technology, and machine learning plays an important role in image processing technology. The depth data may provide geometric information in the image, and the depth data includes a large amount of information useful for image segmentation, and by encoding the depth image into images of three different channels in three dimensions and then using colors and encoded images as inputs, the convolution neural network is trained, so as to calculate the segmentation characteristics of the image and thereby implement segmentation of the image.

However, in the current manner of implementing image segmentation by convolution neural network, the output of convolution neural network loses most of the useful information contained in the depth data for image segmentation, and there is a problem of poor image segmentation accuracy.

SUMMARY

According to various embodiments of the present application, methods and apparatuses for image segmentation, computer devices, and storage mediums are provided.

A method for image segmentation includes:
acquiring a to-be-segmented image;
inputting the to-be-segmented image into an input variable of a full convolution neural network and outputting a convolution characteristic pattern;
inputting the convolution characteristic pattern into an input variable of a context-switchable neural network and outputting context expression information; and
generating an intermediate characteristic pattern for image segmentation according to the convolution characteristic pattern and the context expression information.

A computer device includes a memory and a processor, the memory stores a computer program which, when executed by the processor, causes the processor to perform the steps of:
acquiring a to-be-segmented image;
inputting the to-be-segmented image into an input variable of a full convolution neural network and outputting a convolution characteristic pattern;
inputting the convolution characteristic pattern into an input variable of a context-switchable neural network and outputting context expression information; and
generating an intermediate characteristic pattern for image segmentation according to the convolution characteristic pattern and the context expression information.

A non-transitory computer-readable storage medium storing computer-readable instructions that, when executed by one or more processors, cause the one or more processors to perform the steps of:
acquiring a to-be-segmented image;
inputting the to-be-segmented image into an input variable of a full convolution neural network and outputting a convolution characteristic pattern;
inputting the convolution characteristic pattern into an input variable of a context-switchable neural network and outputting context expression information; and
generating an intermediate characteristic pattern for image segmentation according to the convolution characteristic pattern and the context expression information.

The details of at least an embodiment of the present disclosure will be presented with reference to the following drawings and description. Other characteristic and advantages of the present disclosure will be more apparent from the specification, drawings and claims.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

The present disclosure will be described in details in combination with the accompanying drawings and embodiments such that the technical solution and advantages of the present disclosure will be more apparent. It should be understood that the particular embodiments are described for the purpose of illustrating as opposed to restricting the present disclosure.

Unless otherwise defined, all technical and scientific terms used herein have the same meaning as those generally understood by those skilled in the art of the present application. The terminology used herein in the specification of this application is intended only for the purpose of describing specific embodiments and is not intended to limit this application. Each of the technical features of the above embodiments may be combined arbitrarily, and all of the possible combinations of each of the technical features of the above embodiments are omitted for brevity, however, to the extent the combinations of these technical features are not contradictory, they all should be considered to be within the scope of this application.

Figure 1:
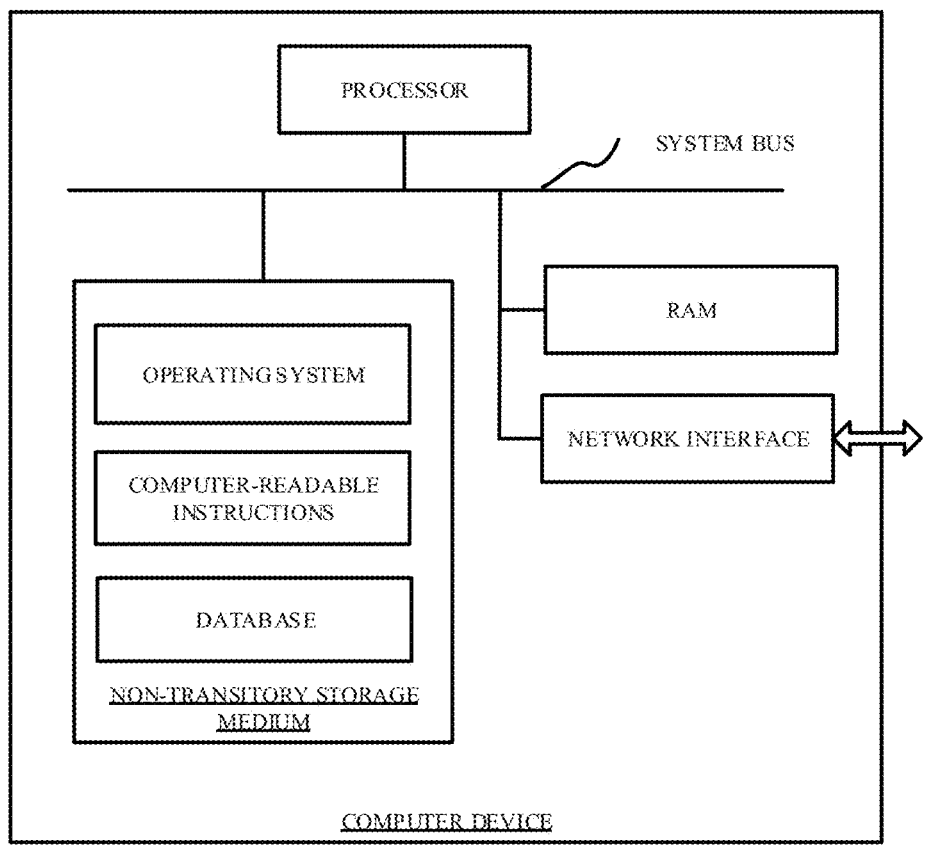
FIG. 1 is a schematic diagram of an internal structure of a computer device according to an embodiment.

As shown in FIG. 1, which is a schematic diagram of an internal structure of a computer device according to an embodiment. The computer device may be a terminal or a server, the terminal may be an electronic device having a communication function, such as a smartphone, a tablet computer, a notebook computer, a desktop computer, a personal digital assistant, a wearable device, a vehicle-mounted device, etc. The server may be a separate server, or may be a server cluster. Referring to FIG. 1, the computer device includes a processor, a non-transitory storage medium, a random access memory (RAM), and a network interface that are connected via a system bus. The non-transitory storage medium of the computer device may store an operating system and a computer program that, when executed, may cause the processor to perform a method for processing an image. The processor of the computer device is configured to provide computing and control capabilities to support the operation of the entire computer device. The RAM may store an operating system, a computer program, and a database. When the computer program is executed by the processor, the processor may be caused to execute a method for processing an image. The network interface of the computer device is configured for network communication.

Those skilled in the art will appreciate that the structure shown in FIG. 1 is merely a block diagram of a portion of the structure associated with the solution of the present disclosure, and does not constitute a limitation on the computer device to which the solution of the present disclosure is applied, a particular computer device may include more or less components, or combine certain components, or with a different arrangement of components.

Figure 2:
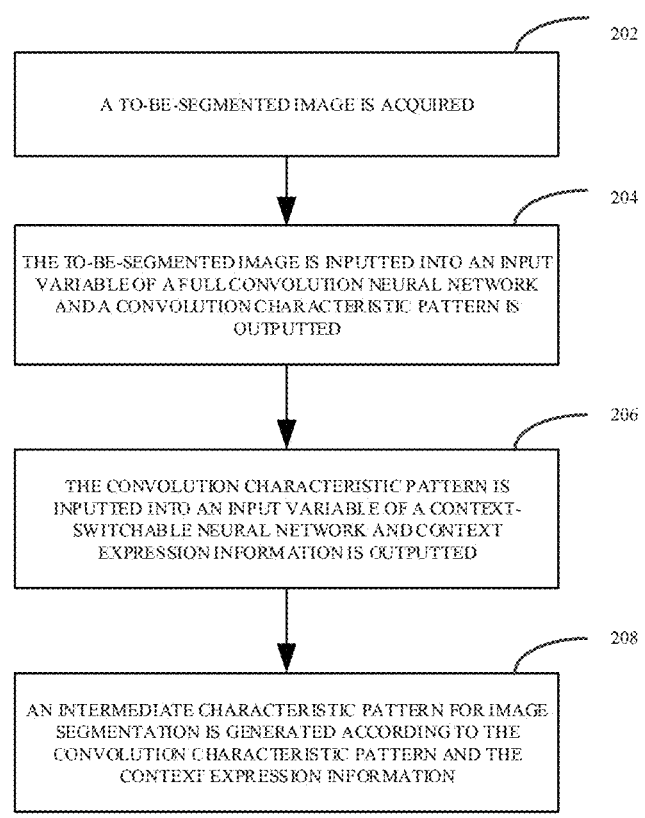
FIG. 2 is a flow chart of a method for image segmentation according to an embodiment.

In an embodiment, as shown in FIG. 2, a method for image segmentation is provided and described being applied to the computer device of FIG. 1, which includes the following steps:

At step 202, a to-be-segmented image is acquired.

The image is a description or portrait of an objective object, and is a common information carrier, and the image contains information about the object to be described, for example, an image may be a photograph of different objects captured by a camera, or may be an information carrier containing different object information synthesized by computer software.

Image segmentation refers to segmenting an image into a plurality of specific districts with unique properties. The to-be-segmented image may be acquired in real time, or may be pre-stored. For example, the computer device may acquire the to-be-segmented image acquired by the user in real time through a camera, or may store the to-be-segmented image in a database in advance. The to-be-segmented image is then acquired from the database.

At step 204, the to-be-segmented image is inputted into an input variable of a full convolution neural network and a convolution characteristic pattern is outputted.

Full Convolutional Networks (FCN) is a pre-trained neural network model that can be used for image segmentation. The FCN for image segmentation may recover the class to which each pixel belongs from the abstract feature, i.e., further extending from the classification of the image level to the classification of the pixel level. The full convolution neural network model may include a convolution layer and a pooling layer. The convolution layer has a convolution kernel configured to extract a weight matrix of the characteristics, and the number of weights can be reduced by setting the step length of the convolution operation. The pooling layer, also referred to as the lower sampling layer, may reduce the dimension of the matrix.

The computer device uses the to-be-segmented image as input item data of the pre-trained full convolution neural network. The computer device inputs the to-be-segmented image to the convolution layer, and the convolution kernel scans the inputted to-be-segmented image forward and backward at a corresponding length, i.e. at a size of the convolution kernel, and performs a convolution operation. After the convolution processing, the processing is then performed at the pooling layer, and the pooling layer can effectively reduce the dimension. The full convolution neural network may output a convolution characteristic pattern obtained after processing by the convolution layer and the pooling layer.

At step 206, the convolution characteristic pattern is inputted into an input variable of a context-switchable neural network and context expression information is outputted.

The context-switchable neural network is pre-trained according to the image structure and depth data, and the context-switchable neural network is a full convolution neural network and also includes a convolution layer and a pooling layer. The context expression information refers to some information or all information that can affect an object in an image.

After the computer device inputs the convolution characteristic pattern to the input variable of the context-switchable neural network, the convolution layer and the pooling layer in the context-switchable neural network process the convolution characteristic pattern to obtain the context expression information of the convolution characteristic pattern.

At step 208, an intermediate characteristic pattern for image segmentation is generated according to the convolution characteristic pattern and the context expression information.

The intermediate characteristic pattern may be a plurality of characteristic patterns with different resolution. The intermediate characteristic patterns may be sorted in an order from top to bottom with increasing resolution. The intermediate characteristic pattern may be generated according to the convolution characteristic pattern and the context expression information, and the specific equation may be represented as: $F^{l+1}=M^{l+1}+D^{l\to(l+1)}$, $l=0,\ldots,L-1$ where L is the number of intermediate characteristic patterns, $F^{l+1}$ is the resulting intermediate characteristic pattern, $F^1$ is the intermediate characteristic pattern with the lowest resolution, and $F^l$ is the intermediate characteristic pattern with the highest resolution. M is a convolution characteristic pattern outputted by the full convolution neural network, and $D^{l\to(l+1)}$ is context expression information corresponding to the convolution characteristic pattern M. The generated intermediate characteristic pattern is configured for image segmentation.

By acquiring the to-be-segmented image, the computer device inputs the to-be-segmented image into an input variable of the full convolution neural network, and outputs a convolution characteristic pattern, and the computer device inputs the convolution characteristic pattern into an input variable of the context-switchable neural network and outputs context expression information; the computer device generates an intermediate characteristic pattern for image segmentation according to the convolution characteristic pattern and the context expression information. The computer device may improve the accuracy of image segmentation by shrinking the image in conjunction with the convolution neural network and stacking the characteristic of the image for calculating the image semantics, and using the context expression information generated by the context-switchable neural network for image segmentation.

Figure 3:
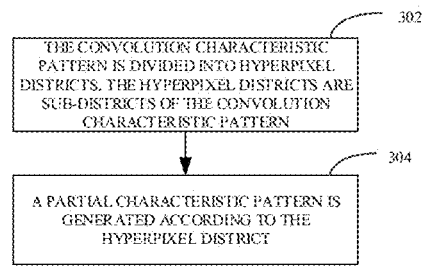
FIG. 3 is a flow chart of a method for generating a partial characteristic pattern according to an embodiment.

As shown in FIG. 3, in an embodiment, a proposed method for image segmentation may further include a process of generating a partial characteristic pattern, the specific step includes.

At step 302, the convolution characteristic pattern is divided into hyperpixel districts, the hyperpixel districts are sub-districts of the convolution characteristic pattern.

A hyperpixel is to segment a graph originally of a pixel-level into graphs of a district-level, and a computer device may use a hyperpixel algorithm to perform a hyperpixel segmentation on an image. After the computer device performs hyperpixel segmentation on the image, a number of districts of varying sizes can be obtained, which contain valid information, such as color histograms, texture information. For example, there is a person in the image, and it is possible to perform the hyperpixel segmentation on the image of this person, and further extract the features of each small district, identify the parts of the body in the districts (the head, the shoulder, and the leg), thereby establishing a joint image of the human body.

After performing the hyperpixel segmentation on the convolution characteristic pattern, a plurality of hyperpixel districts can be obtained, and none of the obtained plurality of hyperpixel districts is an overlapping district, all of which are sub-districts of the convolution characteristic pattern.

At step 304, a partial characteristic pattern is generated according to the hyperpixel district.

Each hyperpixel district corresponds to a partial characteristic pattern, and the equation generated by the partial characteristic pattern may be expressed as.

$$D^l(ri) = F^l(ri) + \sum_{ri \neq rj} H(F^l(ri)), \text{ s.t. } ri, rj \in \phi(S_n),$$

$S_n$ is the hyperpixel district, and ri is a receptive field in the image to be segmented. The receptive field is the size of the visual sense district, and in the convolution neural network, the receptive field is defined as the size of the district on which the pixels on the characteristic pattern outputted by each layer of the convolution neural network are mapped on the original image, $\phi(S_n)$ is a set of centers of the receptive fields in a plurality of hyperpixel districts, and H(:) is a partial structure diagram. From the equation, it can be learned that, for the district ri, the generated partial characteristic pattern contains the characteristics of the intermediate characteristic pattern, and therefore, the generated partial characteristic pattern retains the contents of the original district ri.

By segmenting the convolution characteristic pattern into hyperpixel districts, the hyperpixel district is a sub-district of the convolution characteristic pattern, and the computer device generates a partial characteristic pattern according to the hyperpixel district. The computer device first divides the convolution characteristic pattern into hyperpixel districts, and then generates a partial characteristic pattern according to the hyperpixel district, so that content in the original district can be retained, and image segmentation can be more accurate.

Figure 4:
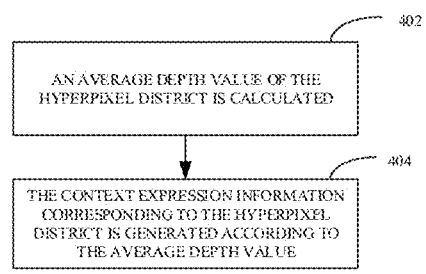
FIG. 4 is a flow chart of a method for generating context expression information according to an embodiment.

In an embodiment, as shown in FIG. 4, a method for image segmentation provided may further include a process of generating context expression information, the specific steps include:

At step 402, an average depth value of the hyperpixel district is calculated.

The gray scale value of each pixel in the depth image may be used to characterize the distance of a point in the scene from the camera, the depth value is the distance value of a point in the scene from the camera. A plurality of objects may coexist in the hyperpixel district at the same time. By obtaining the depth value of each object in the hyperpixel district, the computer device may calculate the average depth values of the entire hyperpixel district according to the depth value of each object.

At step 404, the context expression information corresponding to the hyperpixel district is generated according to the average depth value.

The depth value is important data for generating context expression information. The context expression information corresponding to each hyperpixel district is generated according to an average depth value of each hyperpixel district.

The computer device generates context expression information corresponding to the hyperpixel district according to the average depth value by calculating the average depth value of the hyperpixel district. The computer device generates the corresponding context expression information according to the average depth value of the hyperpixel district, so that the generated context expression information can be more accurate, thereby improving the accuracy of image segmentation.

Figure 5:
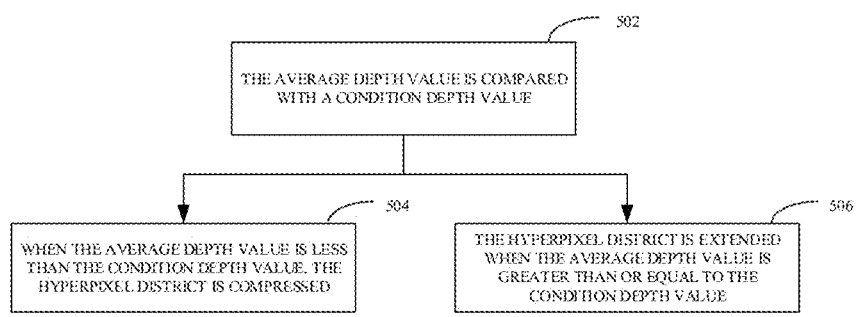
FIG. 5 is a flow chart of a method for processing a hyperpixel district according to an embodiment.

As shown in FIG. 5, in an embodiment, a method for image segmentation provided may further include a process for processing a hyperpixel district, the specific steps include:

At step 502, the average depth value is compared with a condition depth value.

The condition depth value may be a predetermined specific value. After calculating the average depth value, the computer device may compare depth value with the condition depth value.

At step 504, when the average depth value is less than the condition depth value, the hyperpixel district is compressed.

When the average depth value is less than the condition depth value, it indicates that the amount of information in the hyperpixel district is large, and the computer device needs to refine the information in the hyperpixel district using a compression architecture to reduce the excessive-diversified information in the hyperpixel district. The compression architecture may learn to reweight the corresponding hyperpixel district, and the equation for compressing the hyperpixel district is: $D_c^l(rj) = D^l(rj) \odot c(D^l(rj))$, rj is a hyperpixel district where the average depth value is less than the condition depth value, c is a compression architecture, $D^l$ is a structure characteristic diagram, and $\odot$ means a multiplication of elements corresponding to the matrix. $D_c^l(rj)$ is the hyperpixel district after compression by the compression architecture.

At step 506, the hyperpixel district is extended when the average depth value is greater than or equal to the condition depth value.

When the average depth value is greater than or equal to the condition depth value, it indicates that the amount of information in the hyperpixel district is small, and the computer device needs to use an extension architecture to enrich the information in the hyperpixel district. The extension architecture extends the hyperpixel district by the following equation. $D_e^l(rj)=D^l(rj)+\varepsilon(D^l(rj))$. $D_e^l(rj)$ is a hyperpixel district extended by the extension architecture By comparing the average depth value with the condition depth value, when the average depth value is less than the condition depth value, the computer device compresses the hyperpixel district; and when the average depth value is greater than or equal to the condition depth value, the computer device extends the hyperpixel district. The computer device can improve the accuracy of image segmentation by selecting the compression architecture or extension architecture to process the hyperpixel district according to the scale of the average depth value.

In an embodiment, the context expression information generated by the context-switchable neural network may be represented by an equation, specifically.

$$D^{l\to(l+1)}(ri) = \sum_{S_m \in N(S_n)} \sum_{rj \in \phi(S_m)} (\lambda_c D_c^l(rj) + \lambda_e D_e^l(rj)),$$

$$\text{s.t. } \lambda_c = LI(d(S_n) \prec d(S_m)), \lambda_e = LI(d(S_n) \geq d(S_m))$$

The hyperpixel district $S_n$ is adjacent to the hyperpixel district $S_m$, by which the computer device can transmit top-down information of the receptive field district rj the hyperpixel district $S_m$ to the receptive field district ri, $D_e^l$ is an extension architecture, $D_c^l$ is a compression architecture and $d(S_n)$ is an average depth of the hyperpixel district $S_n$. The indicator function LI(:) is configured to switch the extension architecture and the compressed architecture. When $d(S_n) \prec d(S_m)$, the computer device may switch to the compression architecture to refine the information of the receptive field ri, and at the time, the computer device may switch to the compression architecture to enrich the information of the receptive field.

Figure 6:
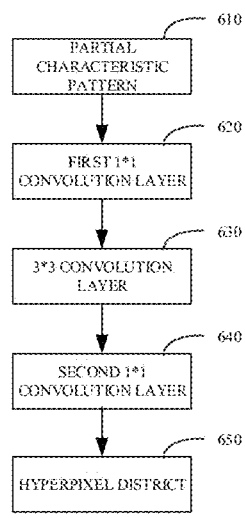
FIG. 6 is a schematic view of a compression architecture according to an embodiment.

In an embodiment, as shown in FIG. 6, a method for image segmentation provided may further include a process of compressing a hyperpixel district 650, in particular: the computer device inputs a partial characteristic pattern corresponding to the hyperpixel district to three preset convolution neural networks for processing, and a compressed hyperpixel district is obtained. The three convolution neural networks include two neural networks whose convolution kernels are 1 and one neural network whose convolution kernel is 3.

As shown in FIG. 6, as an input, the computer device outputs the partial characteristic pattern 610 to the compression architecture. The compression architecture is consisted of a first 1*1 convolution layer 620, a 3*3 convolution layer 630, and a second 1*1 convolution layer 640. The first 1*1 convolution layer 620 and the second 1*1 convolution layer 640 are convolution layers whose convolution kernels are 1, and the 3*3 convolution layer 630 is a convolution layer whose convolution kernel is 3.

After the computer device inputs the partial characteristic pattern 610 into the compression architecture, it is processed by the first 1*1 convolution layer 620. The first 1*1 convolution layer 620 is configured to half the dimension of the partial characteristic pattern 610, and the computer device may filter the useless information in the partial characteristic pattern 610 by halving the dimension, and may also retain the useful information in the partial characteristic pattern 610. After dimension reduction, the 3*3 convolution layer 630 can restore the dimension, rebuild the original dimension, the computer device uses the second 1*1 convolution layer to generate the reweighted vector $c(D^l(rj))$, and generates the compressed hyperpixel district $c(D^l(rj))$ according to the weighted vector.

Figure 7:
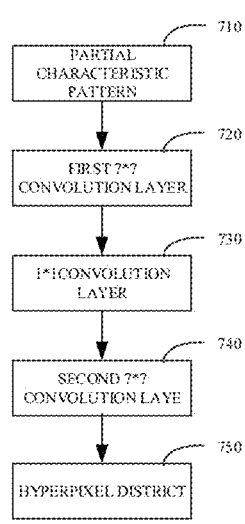
FIG. 7 is a schematic view of an extension architecture according to an embodiment.

As shown in FIG. 7, in an embodiment, a method for image segmentation provided may further include a process of extending a hyperpixel district 750, in particular, a computer device inputs a partial characteristic pattern corresponding to the hyperpixel district to three preset convolution neural networks for processing and obtains an extended hyperpixel district. The three convolution neural networks include two neural networks whose convolution kernels are 7 and one neural network whose convolution kernel is 1.

As shown in FIG. 7, the extension architecture is consisted of a first 7*7 convolution layer 720, a 1*1 convolution layer 730, and a second 7*7 convolution layer 740. After the computer device inputs the partial characteristic pattern 710 into the extension architecture, the first 7*7 convolution layer 720 uses a larger kernel to extend the receptive field and learns relevant context expression information. The 1*1 convolution layer 730 is configured to halve the dimension to remove redundant information contained in the large kernel of first 7*7 convolution layer 720. The second 7*7 convolution layer 740 is configured to restore the dimension, and the second 7*7 convolution layer 740 may also match the dimension of $\varepsilon(D^l(rj))$ with $D^l(rj)$.

In an embodiment, the context-switchable neural network is obtained by training by: the computer device obtains the input layer node sequence according to the convolution characteristic pattern and the class of the convolution characteristic pattern, and obtains the hidden layer node sequence corresponding to the first hidden layer by projecting the input layer node sequence, the first hidden layer is regarded as the current processing hidden layer.

The computer device obtains a hidden layer node sequence of a next hidden layer using a non-linear mapping according to a hidden layer node sequence corresponding to the current processing hidden layer and a weight and a deviation of each neuron node corresponding to the current processing layer, and the computer device regards the next hidden layer as the current processing hidden layer, repeats the step of obtaining the hidden layer node sequence of the next hidden layer using the non-linear mapping according to the hidden layer node sequence corresponding to the current processing hidden layer and the weight and the deviation of each neuron node corresponding to the current processing hidden layer; until an output layer, and acquires a context expression information probability matrix corresponding to a class of the convolution characteristic pattern and outputted from the output layer.

When a convolution characteristic pattern is inputted to a context-switchable neural network, a partial characteristic pattern of different resolution is generated, and the generated partial characteristic pattern is sent to a pixel-by-pixel classifier for semantic segmentation. The pixel-by-pixel classifier may output a set of class tags for the pixels of the partial characteristic pattern, and the sequence of class tags may be expressed as y=f(F^l), the function f(:) is a flexible maximum regression amount that generates a pixel-by-pixel class. y=f(F^l) may be used to predict pixel-by-pixel class tags. The objective function for training the context-switchable neural network may be expressed by the equation.

$$J(F^L) = \sum_{ri \in I} L(y*(ri), y(ri)).$$

The function L(:) a flexible maximum loss value, and for the receptive field district ri, y(ri) can be configured to represent a prediction type label of the receptive field district ri. The computer device may compare the results outputted by the context-switchable neural network with the predicted type label to achieve the training of the context-switchable neural network.

The processing procedure in the context-switchable neural network is: the computer device divides the input convolution characteristic pattern into hyperpixel districts by inputting the convolution characteristic pattern generated by the full convolution neural network and the class tag of the convolution characteristic pattern, and generates a partial characteristic pattern according to the hyperpixel district. The computer device calculates the average depth value of the hyperpixel district and processes the hyperpixel district according to the scale of the average depth value. When the average depth value is less than the condition depth value, the computer device processes the hyperpixel district using a compression architecture and obtains the context expression information of the compressed hyperpixel district; when the average depth value is greater than or equal to the condition depth value, the computer device processes the hyperpixel district using an extension architecture and obtains context expression information of the extended hyperpixel district, and outputs the obtained context expression information.

In an embodiment, the weighting parameters in the context-switchable neural network are adjusted using a gradient descent method.

The calculation equation of the gradient is:

$$\frac{\partial J}{\partial F^l(ri)} = \sum_{S_m \in N(S_n)} \sum_{rj \in \phi(S_m)} \frac{\partial J}{\partial F^{l+1}(rj)} \sum_{rk \in \phi(S_n)} \frac{\partial F^{l+1}(ri)}{\partial D^l(rk)} \frac{\partial D^l(rk)}{\partial F^l(ri)}.$$

$S_n$ and $S_m$ are two adjacent hyperpixel districts, ri, rj, rk respectively represent a receptive field in a to-be-segmented image, and J represents a target function of a training context-switchable neural network model. In the calculation equation of the gradient, $$\frac{\partial F^{l+1}(ri)}{\partial D^l(rk)} = \lambda_c \frac{\partial D_c^l(rk)}{\partial D^l(rk)} + \lambda_e \frac{\partial D_e^l(rk)}{\partial D^l(rk)},$$

$$\lambda_c = \mathbb{1}(d(S_n) < d(S_m)),$$

$$\lambda_e = \mathbb{1}(d(S_n) \geq d(S_m))$$

is an update signal. When the weighting parameters in the context-switchable neural network are adjusted using the calculation equation of the gradient, the intermediate characteristic pattern may be optimized. The receptive field district ri receives an update signal $$\frac{\partial F^{l+1}(ri)}{\partial D^l(rk)}$$

from the receptive field district rk of the hyperpixel district $S_n$, for adjusting the characteristics located in the same hyperpixel district so that these districts exhibit object coexistence. The receptive field district ri also receives an update signal from the receptive field district rj in the adjacent hyperpixel district $S_m$.

In the calculation equation of the gradient, $$\frac{\partial J}{\partial F^{l+1}(rj)}$$

is an update signal from the receptive field district rj. When the update signal is transmitted from the receptive field district rj to the receptive field district ri, the update signal $$\frac{\partial J}{\partial F^{l+1}(rj)}$$

is weighted according to the signal $$\frac{\partial F^{l+1}(ri)}{\partial D^l(rk)}$$

to extend the receptive field district rj. At the same time, the parameters $\lambda_c$ and parameters $\lambda_e$ are switches determined by the average depths of the hyperpixel district $S_n$ and the hyperpixel district $S_m$, that is, according to the average depths of the hyperpixel district $S_n$ and the hyperpixel district $S_m$, it may be determined whether the parameters $\lambda_c$ or the parameters $\lambda_e$ are used for extension. For example, the signal $$\frac{\partial D_c^l(rk)}{\partial D^l(rk)}$$

may be extended to $$\frac{\partial D_c^l(rk)}{\partial D^l(rk)} = C(D^l(rk)) + D^l(rk) \odot \frac{\partial C(D^l(rk))}{\partial D^l(rk)}$$

and, at the same time, the signal $$\frac{\partial D_e^l(rk)}{\partial D^l(rk)}$$

may be extended to $$\frac{\partial D_e^l(rk)}{\partial D^l(rk)} = 1 + \frac{\partial \varepsilon(D^l(rk))}{\partial D^l(rk)}.$$

When $d(S_n) \prec d(S_m)$, that is, the average depth value of the hyperpixel district $S_n$ is smaller than the average depth value of the hyperpixel district $S_m$, the signal $$\frac{\partial D_c^l(rk)}{\partial D^l(rk)}$$

weighs the gradient of the reverse transmission of the signal $$\frac{\partial J}{\partial F^{l+1}(rj)}$$

transmitted from the receptive field district rj. The compression architecture C(:) may be optimized by reverse transfer, the reverse transfer refers to the transfer of a target function $$J(F^L) = \sum_{ri \in I} L(y*(ri), y(ri))$$

to the compression architecture C(:). The re-weighting vector $C(D^l(rk))$ also participates in the update signal $$\frac{\partial D_c^l(rk)}{\partial D^l(rk)}.$$

When training the context-switchable neural network, the computer device uses a vector $C(D^l(rk))$ to select information in the partial characteristic pattern $D^l(rk)$ useful for segmentation to construct an intermediate characteristic pattern $F^{l+1}(rj)$. Together with the re-weighting vector $C(D^l(rk))$, information in the receptive field district rj useful for segmentation may better guide the receptive field district ri to update information.

When $d(S_n) \geq d(S_m)$, that is, the average depth value of the hyperpixel district $S_n$ is greater than or equal to the average depth value of the hyperpixel district $S_m$, the signal $$\frac{\partial D_c^l(rk)}{\partial D^l(rk)}$$

affects the signal $$\frac{\partial J}{\partial F^{l+1}(rj)}.$$

A hopping connection between the receptive field district rj and the receptive field district ri may be formed by factor 1, the hopping connection is that information is propagated between the hyperpixel districts without any neural network. When information is propagated between different districts as such, it is weighted by the factor 1 and the signal does not undergo any change. The extension architecture is to obtain context expression information by extending the receptive field, but a large convolution kernel of the extension architecture may disperse the reverse-transmitted signal from the receptive field district rj to the receptive field district ri during training, and the use of the hopping connection allows reverse-transmitted signal to be transmitted directly from the receptive field district rj to the receptive field district ri.

Using the gradient descent algorithm, the computer device can optimize the weighting parameters of the context-switchable neural network, which is more advantageous for image segmentation.

Figure 8:
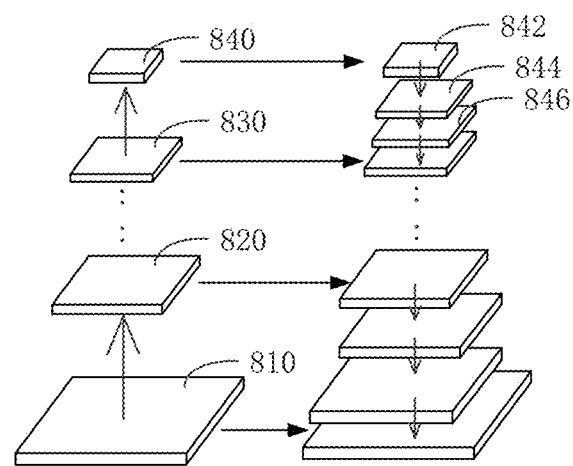
FIG. 8 is a schematic view of an architecture of a context-switchable neural network according to an embodiment.

In an embodiment, the architecture of the context-switchable neural network is shown in FIG. 8. After the computer device inputs the to-be-segmented image into the full convolution neural network, a plurality of convolution characteristic patterns are outputted. A first convolution characteristic pattern 810, a second convolution characteristic pattern 820, a third convolution characteristic pattern 830, a fourth convolution characteristic pattern 840, etc. With the fourth convolution characteristic pattern 840 as an example, the fourth convolution characteristic pattern 840 is inputted to a context-switchable neural network that divides hyperpixel districts for the fourth convolution characteristic pattern 840, and generates the partial characteristic pattern 844 according to the hyperpixel district. The context-switchable neural network calculates the average depth value of the hyperpixel district and selects the compression or extension architecture according to the average depth value to generate the context expression information 846. The context-switchable neural network generates an intermediate characteristic pattern 842 for image segmentation according to the partial characteristic pattern 844 and the context expression information 846.

Figure 9:
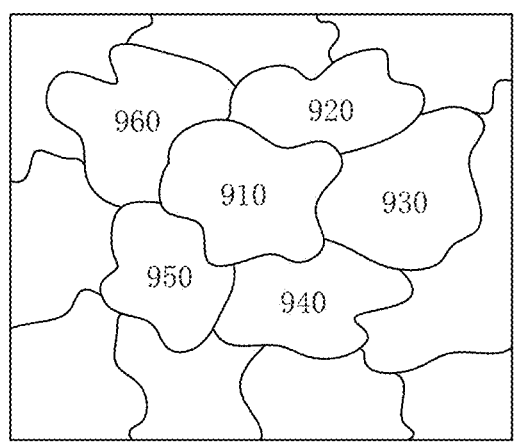
FIG. 9 is a schematic view of a partial structure corresponding to an average depth value of a hyperpixel district according to an embodiment.

In an embodiment, the partial structure corresponding to the average depth value of the hyperpixel district is shown in FIG. 9. The context-switchable neural network calculates an average depth value for each hyperpixel district and compares the calculated average depth value with a condition depth value to determine that the hyperpixel district is processed using the compression architecture or the extension architecture. For example, the average depth value of the first hyperpixel district 910 is 6.8, the average depth value of the second hyperpixel district 920 is 7.5, and the average depth value of the third hyperpixel district 930 is 7.3, the average depth value of the fourth hyperpixel district 940 is 3.6, the average depth value of the fifth hyperpixel district 950 is 4.3, and the average depth value of the sixth hyperpixel district 960 is 3.1. When the preset condition depth value is 5.0, the first hyperpixel district 910, the second hyperpixel district 920, and the third hyperpixel district 930 should be processed using the compression architecture, while the fourth hyperpixel district 940, the fifth hyperpixel district 950, and the sixth hyperpixel district 960 should be processed using the extension architecture.

In an embodiment, a method for image processing method is provided which is illustrated being applied to a computer device as shown in FIG. 1.

First, the computer device may acquire the to-be-segmented image. Image segmentation refers to segmenting an image into a plurality of specific districts with unique properties. The to-be-segmented image may be acquired in real time, or may be stored in advance, for example, the computer device may acquire the to-be-segmented image acquired by the user in real time through a camera, or the computer device may store the to-be-segmented image in advance in a database, the to-be-segmented image is then acquired from the database.

Next, the computer device may input the to-be-segmented image into an input variable of the full convolution neural network and output the convolution characteristic pattern. The computer device uses the to-be-segmented image as input item data of the pre-trained full convolution neural network. The computer device inputs the to-be-segmented image to the convolution layer, and the convolution kernel scans the inputted to-be-segmented image from the front to the rear according to a corresponding length, i.e. at a size of the convolution kernel, and performs a convolution operation. After the convolution processing, the processing is then performed at the pooling layer, and the pooling layer can effectively reduce the dimension. The full convolution neural network may output a convolution characteristic pattern obtained after processing by the convolution layer and the pooling layer.

Next, the computer device may input the convolution characteristic pattern into the input variable of the context-switchable neural network and output the context expression information. The context-switchable neural network is pre-trained according to the image structure and depth data, and the context-switchable neural network is a full convolution neural network and also includes a convolution layer and a pooling layer. The context expression information refers to some information or all information that can affect an object in an image. After the computer device inputs the convolution characteristic pattern into the input variable of the context-switchable neural network, the convolution layer and the pooling layer in the context-switchable neural network process the convolution characteristic pattern and obtain the context expression information of the convolution characteristic pattern.

The computer device may also segment the convolution characteristic pattern into hyperpixel districts, the hyperpixel districts are sub-districts of the convolution characteristic pattern. After the computer device performs hyperpixel segmentation on the image, a number of districts of varying sizes can be obtained, which contain valid information, such as color histograms, texture information. For example, there is a person in the image, and it is possible to perform the hyperpixel segmentation on the image of this person, and further extract the features of each small district, identify the parts of the body in the districts (the head, the shoulder, and the leg), thereby establishing a joint image of the human body. After performing the hyperpixel segmentation on the convolution characteristic pattern, a plurality of hyperpixel districts can be obtained, and none of the obtained plurality of hyperpixel districts is an overlapping district, all of which are sub-districts of the convolution characteristic pattern. The computer device may also generate a partial characteristic pattern according to the hyperpixel district.

The computer device may also calculate the average depth value of the hyperpixel district. The gray scale value of each pixel in the depth image may be used to characterize the distance of a point in the scene from the camera, the depth value is the distance value of a point in the scene from the camera. A plurality of objects may coexist in the hyperpixel district at the same time. By obtaining the depth value of each object in the hyperpixel district, the computer device may calculate the average depth value of the entire hyperpixel district based on the depth value of each object. The computer device may also generate context expression information corresponding to the hyperpixel district according to the average depth value.

The computer device may also compare the average depth value to the condition depth value. When the average depth value is less than the condition depth value, the computer device compresses the hyperpixel district. When the average depth value is greater than or equal to the condition depth value, the computer device extends the hyperpixel district. When the hyperpixel district is compressed, the partial characteristic pattern corresponding to the hyperpixel district is inputted to the three predetermined convolution neural networks for processing, and the computer device obtains the compressed hyperpixel district. The three convolution neural networks include two neural networks whose convolution kernels are 1 and one neural network whose convolution kernel is 3. When the hyperpixel district is extended, the computer device inputs the partial characteristic pattern corresponding to the hyperpixel district to the three predetermined convolution neural networks for processing to obtain the extended hyperpixel district. The three convolution neural networks include two neural networks whose convolution kernel are 7 and one neural network whose convolution kernel is 1.

Next, the context-switchable neural network is obtained by training by: the computer device obtains the input layer node sequence according to the convolution characteristic pattern and the class of the convolution characteristic pattern, and obtains the hidden layer node sequence corresponding to the first hidden layer by projecting the input layer node sequence; and regards the first hidden layer as the current processing hidden layer. The computer device obtains a hidden layer node sequence of a next hidden layer using a non-linear mapping according to a hidden layer node sequence corresponding to the current processing hidden layer and a weight and a deviation of each neuron node corresponding to the current processing layer, regards the next hidden layer as the current processing hidden layer; repeats the step of obtaining the hidden layer node sequence of the next hidden layer using the non-linear mapping according to the hidden layer node sequence corresponding to the current processing hidden layer and the weight and the deviation of each neuron node corresponding to the current processing hidden layer; until an output layer, and the computer device acquires a context expression information probability matrix corresponding to a class of the convolution characteristic pattern and outputted from the output layer.

It should be appreciated that the steps of the embodiments of the present application are not necessarily performed sequentially in the order indicated by the arrows. The performance of these steps is not critical to the order in which they are performed unless explicitly stated herein, and the steps may be performed in other orders. Moreover, at least a part of the steps of the embodiments may include a plurality of sub-steps or stages, which are not necessarily performed at the same time, but may be performed at different times, and the order in which the sub-steps or stages are performed is not necessarily performed sequentially, but may be performed in turns or alternatively with other steps or at least a part of sub-steps or stages of other steps.

Figure 10:
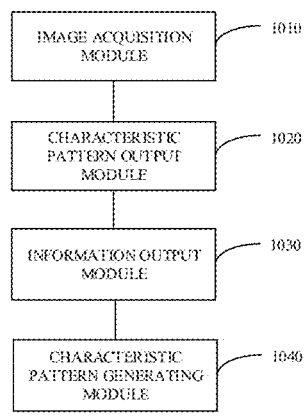
FIG. 10 is a block diagram of an apparatus for image segmentation according to an embodiment.

In an embodiment, as shown in FIG. 10, an apparatus for image processing is provided, which includes an image acquisition module 1010, a characteristic pattern output module 1020, an information output module 1030, and a characteristic pattern generation module 1040.

The image acquisition module 1010 is configured to acquire a to-be-segmented image.

The characteristic pattern output module 1020 is configured to input the to-be-segmented image into an input variable of a full convolution neural network and output a convolution characteristic pattern.

The information output module 1030 configured to input the convolution characteristic pattern into an input variable of a context-switchable neural network and output context expression information.

The characteristic pattern generating module 1040 is configured to generate an intermediate characteristic pattern for image segmentation according to the convolution characteristic pattern and the context expression information.

In an embodiment, the information output module 1030 may also be configured to segment the convolution characteristic pattern into hyperpixel districts, the hyperpixel districts are sub-districts of the convolution characteristic pattern; and generate a partial characteristic pattern according to the hyperpixel district.

In an embodiment, the information output module 1030 may also be configured to calculate an average depth value of the hyperpixel district; and generate context expression information corresponding to the hyperpixel district according to the average depth value.

Figure 11:
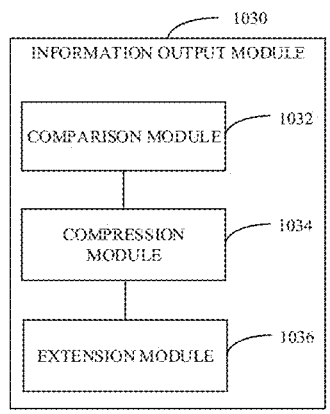
FIG. 11 is a block diagram of an information output module according to an embodiment.

In an embodiment, as shown in FIG. 11, the information output module 1030 includes a comparison module 1032, a compression module 1034, and an extension module 1036.

The comparison module 1032 is configured to compare the average depth value with a condition depth value.

The compression module 1034 is configured to compress the hyperpixel district when the average depth value is less than the condition depth value.

The extension module 1036 is configured to extend the hyperpixel district when the average depth value is greater than or equal to the condition depth value.

In an embodiment, the compression module 1034 may also be configured to input the partial characteristic pattern corresponding to the hyperpixel district to three preset convolution neural networks for processing and obtain a compressed hyperpixel district; and the three convolution neural networks include two neural networks whose convolution kernels are 1 and one neural network whose convolution kernel is 3.

In an embodiment, the extension module 1036 may also be configured to input the partial characteristic pattern corresponding to the hyperpixel district to three preset convolution neural networks for processing and obtaining an extended hyperpixel district; and the three convolution neural networks include two neural networks whose convolution kernel are 7 and one neural network whose convolution kernel is 1.

In an embodiment, an apparatus for image segmentation is provided in which a context-switchable neural network is obtained by training by: the computer device obtains the input layer node sequence according to the convolution characteristic pattern and the class of the convolution characteristic pattern, and obtains the hidden layer node sequence corresponding to the first hidden layer by projecting the input layer node sequence; and regards the first hidden layer as the current processing hidden layer. The computer device obtains a hidden layer node sequence of a next hidden layer using a non-linear mapping according to a hidden layer node sequence corresponding to the current processing hidden layer and a weight and a deviation of each neuron node corresponding to the current processing layer, regards the next hidden layer as the current processing hidden layer; repeats the step of obtaining the hidden layer node sequence of the next hidden layer using the non-linear mapping according to the hidden layer node sequence corresponding to the current processing hidden layer and the weight and the deviation of each neuron node corresponding to the current processing hidden layer; until an output layer, and the computer device acquires a context expression information probability matrix corresponding to a class of the convolution characteristic pattern and outputted from the output layer.

For specific definition of the apparatus for image segmentation, reference may be made to the definition of the above method for image segmentation, and details are omitted for brevity. Each of the modules in the apparatus for image segmentation described may be entirely or partially implemented by software, hardware, or a combination thereof. Each of the modules may be embedded in or independent of the processor in the computer device in the form of hardware, or may be stored in the memory in the computer device in the form of software, so that the processor calls and executes the operations corresponding to each of the modules.

In an embodiment, there is provided a computer device including a memory and a processor, the memory stores a computer program, the processor executes the computer program to perform the steps of:

acquiring a to-be-segmented image; inputting the to-be-segmented image into an input variable of a full convolution neural network and outputting a convolution characteristic pattern; inputting the convolution characteristic pattern into an input variable of a context-switchable neural network and outputting context expression information; and generating an intermediate characteristic pattern for image segmentation according to the convolution characteristic pattern and the context expression information.

In an embodiment, the processor further executes the computer program to perform the steps of segmenting the convolution characteristic pattern into hyperpixel districts, the hyperpixel districts are sub-districts of the convolution characteristic pattern; and generating a partial characteristic pattern according to the hyperpixel district.

In an embodiment, the processor further executes the computer program to perform the step of calculating an average depth value of the hyperpixel district; and generating context expression information corresponding to the hyperpixel district according to the average depth value.

In an embodiment, the processor further executes the computer program to perform the steps of comparing the average depth value with a condition depth value; compressing the hyperpixel district when the average depth value is less than the condition depth value; and extending the hyperpixel district when the average depth value is greater than or equal to the condition depth value.

In an embodiment, the processor further executes the computer program to perform the steps of inputting the partial characteristic pattern corresponding to the hyperpixel district to three preset convolution neural networks for processing and obtaining a compressed hyperpixel district; and the three convolution neural networks include two neural networks whose convolution kernels are 1 and one neural network whose convolution kernel is 3.

In an embodiment, the processor further executes the computer program to perform the steps of inputting the partial characteristic pattern corresponding to the hyperpixel district to three preset convolution neural networks for processing and obtaining an extended hyperpixel district; and the three convolution neural networks include two neural networks whose convolution kernel are 7 and one neural network whose convolution kernel is 1.

In an embodiment, the context-switchable neural network is obtained by training by: obtaining an input layer node sequence according to the convolution characteristic pattern and a class of the convolution characteristic pattern, projecting the input layer node sequence to obtain a hidden layer node sequence corresponding to a first hidden layer, and regarding the first hidden layer as a current processing hidden layer; and obtaining a hidden layer node sequence of a next hidden layer using a non-linear mapping according to a hidden layer node sequence corresponding to the current processing hidden layer and a weight and a deviation of each neuron node corresponding to the current processing hidden layer, and regarding the next hidden layer as the current processing hidden layer; repeating the step of obtaining the hidden layer node sequence of the next hidden layer using the non-linear mapping according to the hidden layer node sequence corresponding to the current processing hidden layer and the weight and the deviation of each neuron node corresponding to the current processing hidden layer; until an output layer, and acquiring a context expression information probability matrix corresponding to a class of the convolution characteristic pattern and outputted from the output layer.

In an embodiment, a computer-readable storage medium is provided, which stores a computer program that, when executed by a processor, causes the processor to perform:

acquiring a to-be-segmented image; inputting the to-be-segmented image into an input variable of a full convolution neural network and outputting a convolution characteristic pattern; inputting the convolution characteristic pattern into an input variable of a context-switchable neural network and outputting context expression information; and generating an intermediate characteristic pattern for image segmentation according to the convolution characteristic pattern and the context expression information.

In an embodiment, the processor further executes the computer program to perform the steps of segmenting the convolution characteristic pattern into hyperpixel districts, the hyperpixel districts are sub-districts of the convolution characteristic pattern; and generating a partial characteristic pattern according to the hyperpixel district.

In an embodiment, the processor further executes the computer program to perform the steps of calculating an average depth value of the hyperpixel district; and generating context expression information corresponding to the hyperpixel district according to the average depth value.

In an embodiment, the processor further executes the computer program to perform the steps of comparing the average depth value with a condition depth value; compressing the hyperpixel district when the average depth value is less than the condition depth value; and extending the hyperpixel district when the average depth value is greater than or equal to the condition depth value.

In an embodiment, the processor further executes the computer program to perform the steps of inputting the partial characteristic pattern corresponding to the hyperpixel district to three preset convolution neural networks for processing and obtaining a compressed hyperpixel district; and the three convolution neural networks include two neural networks whose convolution kernels are 1 and one neural network whose convolution kernel is 3.

In an embodiment, the processor further executes the computer program to perform the steps of inputting the partial characteristic pattern corresponding to the hyperpixel district to three preset convolution neural networks for processing and obtaining an extended hyperpixel district; and the three convolution neural networks include two neural networks whose convolution kernel are 7 and one neural network whose convolution kernel is 1.

In an embodiment, the context-switchable neural network is obtained by training by: obtaining an input layer node sequence according to the convolution characteristic pattern and a class of the convolution characteristic pattern, projecting the input layer node sequence to obtain a hidden layer node sequence corresponding to a first hidden layer, and regarding the first hidden layer as a current processing hidden layer; and obtaining a hidden layer node sequence of a next hidden layer using a non-linear mapping according to a hidden layer node sequence corresponding to the current processing hidden layer and a weight and a deviation of each neuron node corresponding to the current processing hidden layer, and regarding the next hidden layer as the current processing hidden layer; repeating the step of obtaining the hidden layer node sequence of the next hidden layer using the non-linear mapping according to the hidden layer node sequence corresponding to the current processing hidden layer and the weight and the deviation of each neuron node corresponding to the current processing hidden layer; until an output layer, and acquiring a context expression information probability matrix corresponding to a class of the convolution characteristic pattern and outputted from the output layer.

The technical solution of the present application has been proved to be feasible experimentally, and the specific experimental procedure is as follows:

In the experiment, the computer device uses two common benchmarks to test the context-switchable neural network in the present disclosure for semantic segmentation of the depth map RGB-D (Red, Green, Blue, Depth Map), the two common references are the NYUDv2 dataset and the SUN-RGBD dataset. The NYUDv2 dataset has been widely used to evaluate segmentation performance with 1449 RGB-D images. In this dataset, 795 images are used for training and 654 images are used for testing. First, the computer device may select a verification set of 414 images from the original training set. The computer device uses pixel-by-pixel marking to mark the classes of images, all of the pixels are marked with 40 classes. The computer device uses the NYUDv2 dataset to evaluate the method described and further uses the SUN-RGBD dataset to compare with the advanced method.

Next, the computer device uses a multi-scale test to calculate the segmentation results. That is, the computer device uses four ratios (i.e., 0.6, 0.8, 1, 1.1) to reset the size of the test image before providing the test image to the network. For the post-processing of the conditional random field algorithm (CRF), the output segmentation scores of the images rescaled by the computer device are averaged.

When performing an experiment on the NYUDv2 data set, the computer device first needs to calculate the sensitivity of the number of hyperpixels. In the context-switchable neural network, the control portion of the context expression information depends on the size of the hyperpixel. The computer device resizes the hyperpixels using tools, and empirically selects different scales, 500, 1000, 2000, 4000, 8000, and 12000, respectively. For each scale, the computer device may train the context-switchable neural network based on the ResNet-101 model. In the RGB image of the input depth image of the context-switchable neural network, the depth image is used to switch characteristics, and the RGB image is used to segment images. The segmentation accuracy of the NYUDv2 verification set is shown in Table 1:

TABLE 1

| | Hyperpixel Scale | | | | | |
|---|---|---|---|---|---|---|
| | 500 | 1000 | 2000 | 4000 | 8000 | 12000 |
| Segmentation Accuracy | 42.7 | 43.5 | 45.6 | 43.6 | 44.2 | 42.9 |

As shown in Table 1, the segmentation accuracy corresponding to each scale is expressed in average interaction ratio (%). When the scale is set to 500, the segmentation accuracy is the lowest. This occurs because the super pixel is too small and therefore contains too little context information. As the scale increases, the segmentation performance is improving. When the scale is set to 2000, the context-switchable neural network segmentation accuracy is best. Excessive large hyperpixels can degrade the performance, because excessive large hyperpixels may include additional objects that limit the stage preservation of the hyperpixel nature. In subsequent experiments, the computer device may continue to use a scale of 2000 to construct a context-switchable neural network.

Next, the experiment also requires a policy for partial structure information transfer. Partial structure information transfer generates characteristics that have a stronger relationship to the district. As shown in Table 2, the local structure information transfer is replaced by other policies that use the structure information. The first experiment measures the performance of a method that does not use the partial structure information, using a full version of the context-switchable neural network, to achieve a segmentation score of 45.6 on the NYUDv2 verification set. The computer device then retrains the context-switchable neural network without passing the partial structure information of the hyperpixel. Similarly, all intermediate characteristics are processed by a global constant mapping, reaching an accuracy of 40.3. In addition, the computer device applies interpolation and deconvolution to generate new characteristics, each district contains information of a broader but regular receptive field, but these methods generate structurally insensitive characteristics with a lower score than the context-switchable neural network.

TABLE 2

| Policy | Local Information Propagation | Segmentation Accuracy |
|---|---|---|
| Do not transfer hyperpixels | Global Constant Mapping | 40.3 |
| Transfer hyperpixels | Deconvolution | 41.8 |
| | Interpolation | 43.0 |
| | Implement Mapping by the Same Kernel | 43.8 |
| | 3*3 Convolution Kernel | 44.5 |
| | 5*5 Convolution Kernel | 42.1 |
| | Complete Context-switchable Neural Network | 45.6 |

As shown in Table 2, there are several ways to transfer local structure information of hyperpixel. The information is calculated by averaging the characteristics of the districts in the same hyperpixel, which means that the local structure mapping is implemented by the same kernel, according to which a segmentation score of 43.8 is achieved. Since the same kernel does not contain learnable parameters, flexibility to select useful information is missed. Using different convolution kernels, such as the ones with dimensions of 3*3 and 5*5, the larger kernels produce less favorable results than the 11 kernels that capture a finer structure of the hyperpixel.

Next, the experiment also requires a top-down evaluation of switchable transmissions. Given partial structural characteristics, the computer device may apply an top-down switchable information transfer to generate the context expression, the context expression is guided by hyperpixels and depth, as follows.

As shown in Table 3, the computer device may measure top-down transfer according to different data without using hyperpixels and depths, and only the deconvolution and interpolation are applied to construct the context expression. The segmentation accuracy obtained by the computer device is lower than that of the context-switchable neural network.

TABLE 3

| Hyperpixel | Depth | Method | Segmentation Accuracy |
|---|---|---|---|
| NO | NO | Deconvolution | 42.4 |
| | | Interpolation | 42.7 |
| NO | YES | Top-Down Information Transfer | 43.4 |
| YES | NO | Compression | 43.0 |
| | | Extension | 41.6 |
| YES | YES | Context-switchable Neural Network | 45.6 |

In the subsequent test, only the guidance of the hyperpixels is disabled, followed by the top-down information transfer. Without hyperpixels, the computer device performs a switchable process transfer on the compressed and extended characteristic pattern, the information transfer is defined by a conventional kernel. The full context-switchable neural network has better performance than this configuration. In addition to the fact that hyperpixels provide more natural information transfer, the average depth calculated by the computer device on each hyperpixel enables more stable characteristic switching by avoiding the noise depth of the isolated district.

In addition, the experiment also studied the case where depth is not used in top-down switching information transfer. In this case, the computer device separately expresses the compressed and extended characteristic patterns as context expressions. As shown in Table 3, independent compression/extension characteristic patterns lack the flexibility to identify appropriate segmentation characteristic. Their performance is lower than that of a depth-driven and context expressed switchable structure.

Next, the experiment also needs to adjust the compact characteristics of the context information. The top-down switchable information transfer consists of a compression structure and an extension structure and provides different context information. These architectures use compact characteristics to generate context expressions. In the experiment, the computer device adjusts the context information through the compression structure and extension structure and shows that they can achieve effective compact characteristics.

TABLE 4

| Compression Structure | 1*1 Convolution 1*1 Convolution | 1*1 Convolution 3*3 Convolution | 1*1 convolution 3*3 convolution 1*1 convolution |
|---|---|---|---|
| Segmentation Accuracy | 42.3 | 41.7 | 45.6 |

In Table 4, the experiment provide a comparison of different compression structure designs. One simple way to perform information compression is to use a 1*1 convolution to learn compact characteristics, followed by a 1*1 convolution for recovering characteristic dimensions. This results in lower accuracy than the compression architecture. The compression structure involves a 3*3 convolution between two 1*1 convolutions compared to a simple alternative using two consecutive 1*1 convolutions. To some extent, the 3*3 convolution achieves a wider context information, complements the compact characteristics that may result from the size reduction of the information loss, and the characteristics obtained by the 3*3 convolution of the compression structure remain compact. Performance is lower than that of the compression architecture when the last 1*1 convolution for recovering the characteristic dimension is removed and relatively high-dimensional dimension characteristics are generated directly using a 3*3 convolution.

tion is lower than the extension structure, which uses a convolution layer of 1*1 to calculate the compact characteristics.

TABLE 5

| Extension Structure | 7*7 Convolution | 7*7 Convolution 7*7 Convolution | 7*7 Convolution 1*1 Convolution 7*7 Convolution |
|---|---|---|---|
| Segmentation Accuracy | 43.8 | 44.2 | 45.6 |

Next, a comparison experiment of the context-switchable neural network with an advanced method is as follows: the computer device compares the context-switchable neural network with the most advanced method, and the computer device divides all the methods into two groups. All methods are evaluated on the NYUDv2 test set. The first group includes methods that use only RGB images for segmentation, and the computer device lists the performance of these methods in the column RGB inputs. The deep network has a top-down information transfer that generates high-quality segmentation characteristics. The accuracy of the multipath refinement network is the highest in this group. As shown in Table 6.

TABLE 6

| Method of RGB Input | Segmentation Accuracy | Method of RGB-D Input | Segmentation Accuracy |
|---|---|---|---|
| Semantically Segmented Complete Convolution Network | 29.2 | Learn abundant characteristics from the image to perform object detection and segmentation | 28.6 |
| Bayesian Segmentation: Deep Convolutional Encoder-Decoder Architecture for Scene Understanding | 32.4 | Semantic Video Segmentation Space-Time fcn | 30.9 |
| Deep Structure Model of Semantic Segmentation | 40.6 | Semantic Segmentation of Images with Mutual Exclusion Constraints | 31.5 |
| Pyramid Scene Resolution Network | 45.2 | Semantically Segmented Complete Convolution Network | 34.0 |
| Multipath Thinning Network with Identity Mapping with High Resolution Semantic Segmentation | 46.5 | Predict Depth, Surface Normal, and Semantic Label Using a Common Multi-Scale Convolutional Architecture | 34.1 |
| | | Semantic Segmentation Using a Spatial-Temporal Data Drive Pool | 40.1 |
| | | Multipath Thinning Network with Identity Mapping with High Resolution Semantic Segmentation | 47.0 |
| | | Cascaded Characteristic Network | 47.7 |
| | | ResNet-101 | 48.3 |
| | | ResNet-152 | 49.6 |

This shows the importance of the compact characteristics generated by the 3*3 convolution.

In Table 5, the experiment begins to study the extension structure and compare it to different information extension modes. Again, only a single convolution layer with a convolution kernel of 7*7 is used to extend the receptive field to produce a segmentation score of 43.8. It is assumed that additional convolution layers with large convolution kernels can be added to further improve performance. Thus, two 7*7 convolution layers are used to obtain a higher score of 44.2. The segmentation score resulting from the above convolu- Next, the context-switchable neural network is compared to a second set of methods, which use RGB-D images as inputs. The computer device encodes each depth image into a HHA image having 3 channels to maintain more abundant geometric information. The computer device uses the HHA image to train a separate segmentation network to replace the RGB image. The computer-trained network is tested on the HHA image to obtain a segmentation score mapping, the mapping is combined with the segmentation mapping calculated by the network trained on the RGB image. Using this combination policy, the best method is the method of cascading characteristic networks, the result is 47.7. Using RGB and HHA images may improve segmentation accuracy compared to the network.

In addition, the computer device may use RGB and HHA images as training and test data. Based on ResNet-101, the context-switchable neural network reaches 48.3 points. The computer device further uses a deeper layer of the ResNet-152 structure to construct the context-switchable neural network, increasing the segmentation score to 49.6. This result is about 2% better than the most advanced method.

Figure 12:
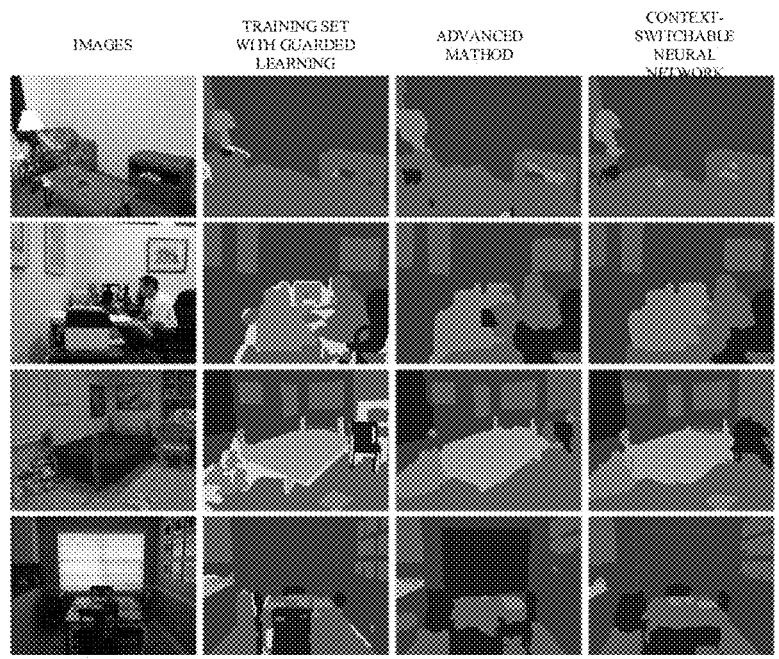
FIG. 12 is a schematic diagram showing a comparison of image acquisition in the NYUDv2 data set by different methods for segmentation in the course of the experiment.

As shown in FIG. 12, the computer device compares the image of the context-switchable neural network segmentation process with the image of the advanced method segmentation process, the image is captured in the NYUDv2 dataset. The context-switchable neural network may enhance image segmentation accuracy.

Next, the context-switchable neural network is also experimented on the SUN-RGBD data set. The SUNRGBD dataset contains 10335 images marked with 37 classes in the SUNRGBD dataset, the SUNRGBD dataset has more complex scene and depth conditions than the NYUDv2 dataset. From this dataset, the computer device selects 5285 images for training and the rest for testing. In this experiment, the computer device again compares the context-switchable neural network to a method using RGB and HHA as input images. The best performance previously on the SUN-RGBD dataset is generated by a cascading characteristic network approach. This model is based on the ResNet-152 structure, the computer device may use a simpler ResNet-101 structure to obtain better results because the computer device performs a reasonable modeling process for information transfer. With deeper ResNet-152, the computer device obtains a segmentation accuracy of 50.7, which is superior to all comparison methods.

Figure 13:
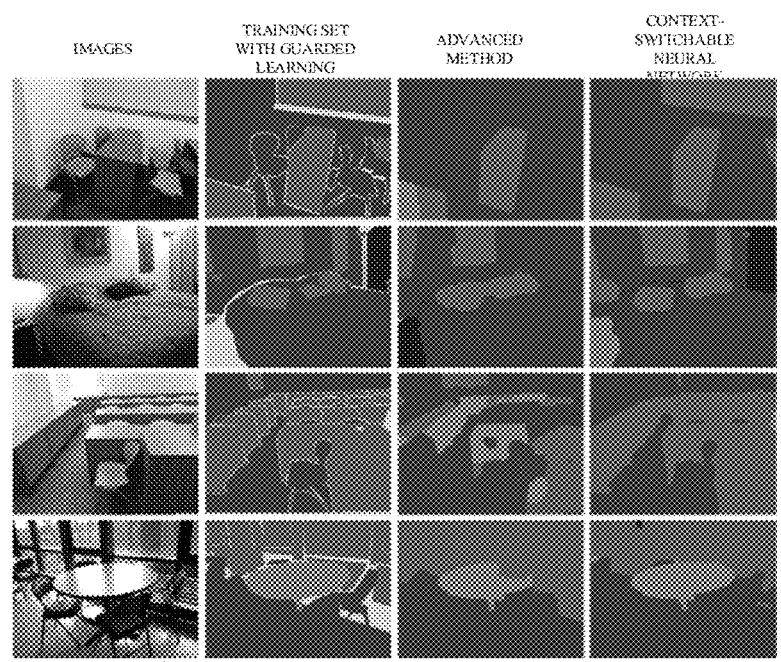
FIG. 13 is a schematic diagram showing a comparison of image acquisition in the SUN-RGBD data set by different methods for segmentation in the course of the experiment.

As shown in FIG. 13, the computer device compares the image segmented and processed by the context-switchable neural network with the image segmented and processed by the advanced method, the image is captured in the SUN-RGBD data set. The context-switchable neural network may enhance image segmentation accuracy.

Persons of ordinary skill in the art understand that all or part of the processes in the methods of the foregoing embodiments may be implemented by a computer program instructing relevant hardware. The computer program may be stored in a non-transitory computer-readable storage medium. When the computer program is executed, flows of embodiments of the methods as described above may be included. Any references to memory, storage, databases, or other media used in the various embodiments provided herein may include non-transitory and/or transitory memory. The non-transitory memory may include a read only memory (ROM), a programmable ROM (PROM), an electrically programmable ROM (EPROM), an electrically erasable programmable ROM (EEPROM), or a flash memory. The transitory memory may include a random access memory (RAM) or an external cache memory. By way of illustration and not limitation, RAM is available in a variety of forms such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM), Memory Bus (Rambus) Direct RAM (RDRAM), Direct Memory Bus Dynamic RAM (DRDRAM), Memory Bus Dynamic RAM (RDRAM) etc.

The foregoing respective technical features involved in the respective embodiments can be combined arbitrarily, for brevity, not all possible combinations of the respective technical features in the foregoing embodiments are described, however, to the extent they have no collision with each other, the combination of the respective technical features shall be considered to be within the scope of the description.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A method for image segmentation, performed in a computer device,
the method comprising:
acquiring a to-be-segmented image;
inputting the to-be-segmented image into an input variable of a full convolution neural network and outputting a convolution characteristic pattern;
inputting the convolution characteristic pattern into an input variable of a context-switchable neural network and outputting context expression information; and
generating an intermediate characteristic pattern for image segmentation according to the convolution characteristic pattern and the context expression information;
wherein the inputting the convolution characteristic pattern into the input variable of the context-switchable neural network and outputting the context expression information comprises:
switchable neural network and outputting the context expression information comprises: districts being sub-districts of the convolution characteristic pattern; and
generating a partial characteristic pattern according to each of the hyperpixel districts, thereby providing a plurality of partial characteristic patterns.

2. The method according to claim 1, wherein after generating the partial characteristic pattern according to each of the hyperpixel districts, the method further comprises:
for each of the plurality of partial characteristic patterns:
inputting the partial characteristic pattern into a pixel-by-pixel classifier for semantic segmentation and obtaining a class tag corresponding to the partial characteristic pattern.

3. The method according to claim 1, wherein the inputting the convolution characteristic pattern into the input variable of the context-switchable neural network and outputting context expression information further comprises:
for each of the hyperpixel districts:
calculating an average depth value of the hyperpixel district; and
generating context expression information corresponding to the hyperpixel district according to the average depth value.

4. The method according to claim 3, wherein the generating context expression information corresponding to the hyperpixel district according to the average depth value comprises:
comparing the average depth value with a condition depth value;
compressing the hyperpixel district when the average depth value is less than the condition depth value; and extending the hyperpixel district when the average depth value is greater than or equal to the condition depth value.

5. The method according to claim 4, wherein the compressing the hyperpixel district when the average depth value is less than the condition depth value comprises:
inputting the partial characteristic pattern corresponding to the hyperpixel district to three preset convolution neural networks for processing and obtaining a compressed hyperpixel district;
wherein the three convolution neural networks comprise two neural networks whose convolution kernels are each 1 and one neural network whose convolution kernel is 3.

6. The method according to claim 4, wherein the extending the hyperpixel district when the average depth value is greater than or equal to the condition depth value comprises:
inputting the partial characteristic pattern corresponding to the hyperpixel district to three preset convolution neural networks for processing and obtaining an extended hyperpixel district;
wherein the three convolution neural networks comprise two neural networks whose convolution kernel are each 7 and one neural network whose convolution kernel is 1.

7. The method according to claim 1, wherein the context-switchable neural network is obtained by training by:
obtaining an input layer node sequence according to the convolution characteristic pattern and a class of the convolution characteristic pattern, projecting the input layer node sequence to obtain a hidden layer node sequence corresponding to a first hidden layer, and regarding the first hidden layer as a current processing hidden layer; and
obtaining a hidden layer node sequence of a next hidden layer using a non-linear mapping according to a hidden layer node sequence corresponding to the current processing hidden layer and a weight and a deviation of each neuron node corresponding to the current processing hidden layer, and regarding the next hidden layer as the current processing hidden layer; repeating the step of obtaining the hidden layer node sequence of the next hidden layer using the non-linear mapping according to the hidden layer node sequence corresponding to the current processing hidden layer and the weight and the deviation of each neuron node corresponding to the current processing hidden layer; the repeating continuing until an output layer is obtained, and acquiring a context expression information probability matrix corresponding to the class of the convolution characteristic pattern and outputted from the output layer.

8. The method according to claim 7, further comprising: adjusting weight parameters of the context-switchable neural network using a gradient descent method.

9. The method according to claim 8, wherein the adjusting the weight parameters of the context-switchable neural network comprise reverse transfer and hop connection;
wherein the reverse transfer is to transfer from the context-switchable neural network to a hyperpixel district, and the hop connection is to propagate information between the hyperpixel districts without the neural network.

10. A computer device, comprising a memory and a processor, the memory storing a computer program configured so that, when executed by the processor, the computer program causes the processor to perform steps comprising: acquiring a to-be-segmented image; inputting the to-be-segmented image into an input variable of a full convolution neural network and outputting a convolution characteristic pattern; inputting the convolution characteristic pattern into an input variable of a context-switchable neural network and outputting context expression information; and generating an intermediate characteristic pattern for image segmentation according to the convolution characteristic pattern and the context expression information;
wherein the computer program is further configured so that, when executed by the processor, the computer program causes the processor to perform, when performing the inputting the convolution characteristic pattern into the input variable of the context-switchable neural network and outputting the context expression information, steps comprising: segmenting the convolution characteristic pattern into hyperpixel districts, the hyperpixel districts being sub-districts of the convolution characteristic pattern; and generating a partial characteristic pattern according to the hyperpixel district.

11. The computer device according to claim 10, wherein the computer program is further configured so that, when the computer program is executed by the processor, the computer program causes the processor to perform steps comprising:
for each of the plurality of partial characteristic patterns:
inputting the partial characteristic pattern into a pixel-by-pixel classifier for semantic segmentation and obtaining a class tag corresponding to the partial characteristic pattern.

12. The computer device according to claim 10, wherein the computer program is further configured so that, when the computer program is executed by the processor, the computer program causes the processor to perform, when performing the inputting the convolution characteristic pattern into the input variable of the context-switchable neural network and outputting the context expression information, steps comprising:
for each of the hyperpixel districts:
calculating an average depth value of the hyperpixel district; and
generating context expression information corresponding to the hyperpixel district according to the average depth value.

13. The computer device according to claim 12, wherein the computer program is further configured so that, when the computer program is executed by the processor, the computer program causes the processor to perform, when performing the generating context expression information corresponding to the hyperpixel district according to the average depth value, steps comprising: comparing the average depth value with a condition depth value; compressing the hyperpixel district when the average depth value is less than the condition depth value; and extending the hyperpixel district when the average depth value is greater than or equal to the condition depth value.

14. The computer device according to claim 13, wherein the computer program is further configured so that, when the computer program is executed by the processor, the computer program causes the processor to perform, when performing the compressing the hyperpixel district when the average depth value is less than the condition depth value, steps comprising: inputting the partial characteristic pattern corresponding to the hyperpixel district to three preset convolution neural networks for processing and obtaining a compressed hyperpixel district; wherein the three convolution neural networks comprise two neural networks whose convolution kernels are each 1 and one neural network whose convolution kernel is 3.

15. A non-transitory computer-readable storage medium storing computer-readable instructions configured so that, when executed by one or more processors, the computer-readable instructions cause the one or more processors to perform steps comprising: acquiring a to-be-segmented image; inputting the to-be-segmented image into an input variable of a full convolution neural network and outputting a convolution characteristic pattern; inputting the convolution characteristic pattern into an input variable of a context-switchable neural network and outputting context expression information; and generating an intermediate characteristic pattern for image segmentation according to the convolution characteristic pattern and the context expression information;

wherein the computer-readable instructions are further configured so that, when executed by the processor, the computer-readable instructions cause the processor to perform, when performing the inputting the convolution characteristic pattern into the input variable of the context-switchable neural network and outputting the context expression information, the steps of: segmenting the convolution characteristic pattern into hyperpixel districts, the hyperpixel districts being sub-districts of the convolution characteristic pattern; and generating a partial characteristic pattern according to the hyperpixel district.

16. The storage medium according to claim 15, wherein the computer-readable instructions are further configured so that, when executed by the processor, the computer-readable instructions cause the processor to perform steps comprising:

for each of the plurality of partial characteristic patterns:
inputting the partial characteristic pattern into a pixel-by-pixel classifier for semantic segmentation and obtaining a class tag corresponding to the partial characteristic pattern.

17. The storage medium according to claim 15, wherein the computer-readable instructions are further configured so that, when executed by the processor, the computer-readable instructions cause the processor to perform, when performing the inputting the convolution characteristic pattern into the input variable of the context-switchable neural network and outputting the context expression information, steps comprising:

for each of the hyperpixel districts:
calculating an average depth value of the hyperpixel district; and
generating context expression information corresponding to the hyperpixel district according to the average depth value.

* * * * *